US012680684B2

(12) United States Patent
Wu et al.

(10) Patent No.: US 12,680,684 B2
(45) Date of Patent: Jul. 14, 2026

(54) LED LAMP WITH LAMP HOLDER AND HAVING ADJUSTABLE LIGHTING FUNCTION

(71) Applicants: Xiamen Topstar Lighting Co., Ltd., Xiamen (CN); Savant Technologies LLC, Cleveland, OH (US)

(72) Inventors: Yongjie Wu, Xiamen (CN); Wenda Wen, Xiamen (CN); Naijun Yang, Xiamen (CN); Kun Xiao, Shanghai (CN)

(73) Assignees: Xiamen Topstar Lighting Co., Ltd., Xiamen (CN); Savant Technologies LLC, Cleveland, OH (US)

( * ) Notice: Subject to any disclaimer, the term of this patent is extended or adjusted under 35 U.S.C. 154(b) by 0 days.

(21) Appl. No.: 18/956,484

(22) Filed: Nov. 22, 2024

(65) Prior Publication Data

US 2025/0084987 A1 Mar. 13, 2025

(30) Foreign Application Priority Data

Oct. 24, 2024 (CN) ........................ 202422579824.0

(51) Int. Cl.

| | |
|---|---|
| ***F21V 23/04*** | (2006.01) |
| ***F21V 3/02*** | (2006.01) |
| ***F21V 15/01*** | (2006.01) |
| ***F21V 23/00*** | (2015.01) |
| ***F21V 23/06*** | (2006.01) |
| ***F21Y 115/10*** | (2016.01) |
| ***H05B 45/10*** | (2020.01) |
| ***H05B 45/20*** | (2020.01) |

(52) U.S. Cl.

CPC ................ *F21V 23/04* (2013.01); *F21V 3/02* (2013.01); *F21V 15/01* (2013.01); *F21V 23/009* (2013.01); *F21V 23/06* (2013.01); *H05B 45/10* (2020.01); *H05B 45/20* (2020.01); *F21Y 2115/10* (2016.08)

(58) Field of Classification Search

CPC . F21V 23/04; F21V 3/02; F21V 15/01; F21V 23/009; F21V 23/06; H05B 45/20; H05B 45/10

See application file for complete search history.

(56) References Cited

U.S. PATENT DOCUMENTS

| | | | | |
|---|---|---|---|---|
| 10,536,618 | B2 * | 1/2020 | Bund | H04N 23/56 |
| 10,893,587 | B2 * | 1/2021 | Halliwell | F21K 9/238 |
| 10,904,969 | B2 * | 1/2021 | Halliwell | F21V 23/003 |

(Continued)

*Primary Examiner* — Bryon T Gyllstrom

(74) *Attorney, Agent, or Firm* — Westbridge IP LLC

(57) ABSTRACT

Disclosed is an LED lamp with a lamp holder and having an adjustable lighting function. The lamp holder is formed with a screwing thread; a dip switch is provided in the lamp holder; an avoidance slot is provided in a top of the lamp holder; and the drive board is electrically connected to the lamp holder, and a dip lever of the dip switch is movably provided in or below the avoidance slot. By setting the dip switch in the lamp holder and setting the avoidance slot on the top of the lamp holder, and after a drive board and the lamp holder are assembled, the dip lever of the dip switch is movably provided in the avoidance slot or is exposed through a connecting link, the adjustment of the color temperature or brightness of a filament lamp is achieved through the exposed dip lever on the lamp holder structure.

14 Claims, 9 Drawing Sheets

(56) References Cited

U.S. PATENT DOCUMENTS

| | | | | |
|---|---|---|---|---|
| 11,248,753 | B1 * | 2/2022 | Li | F21K 9/232 |
| 2015/0061497 | A1 * | 3/2015 | Martins | H05B 45/10 315/291 |
| 2016/0227629 | A1 * | 8/2016 | Conner | H05B 47/184 |
| 2017/0105265 | A1 * | 4/2017 | Sadwick | H05B 45/60 |
| 2023/0103093 | A1 * | 3/2023 | Huang | F21K 9/238 315/112 |
| 2025/0113417 | A1 * | 4/2025 | Savla | H05B 45/10 |

* cited by examiner

LED LAMP WITH LAMP HOLDER AND HAVING ADJUSTABLE LIGHTING FUNCTION

CROSS-REFERENCE TO RELATED APPLICATIONS

This application claims priority to Chinese Patent Application No. 202422579824.0, filed on Oct. 24, 2024, the content of which is incorporated herein by reference in its entirety.

TECHNICAL FIELD

The present application relates to the technical field of lamps, in particular to a Light Emitting Diode (LED) lamp with a lamp holder and having an adjustable lighting function.

BACKGROUND

In related applications of filament lamps, due to the space limitation of the position of a lamp holder, it is difficult to provide a switch on a lamp structure to achieve the control of a filament lamp. Therefore, by additionally providing a radio frequency module to achieve the adjustment of the color temperature, brightness and other lighting functions by way of remote control, the overall development cost of lamps is increased.

SUMMARY

The technical problem to be solved by the present application is to provide an LED lamp with a lamp holder and having an adjustable lighting function to realize lighting adjustment on a lamp body.

In order to solve the above-mentioned technical problems, the present application adopts the following technical solutions.

An LED lamp with a lamp holder and having an adjustable lighting function is provided. The lamp holder is formed with a screwing thread; a dip switch is provided in the lamp holder; an avoidance slot is provided in a top of the lamp holder; and a drive board is electrically connected to the lamp holder, and a dip lever of the dip switch is movably provided in or below the avoidance slot.

Further, a limiting column is provided on an inner wall of the lamp holder; a limiting notch is provided in a peripheral side of the drive board; and the limiting notch is clamped to the limiting column.

Further, a supporting block is provided at a bottom of an inner side of the lamp holder; and the drive board is erected on the supporting block.

Further, a clamping block is provided on an inner wall of the lamp holder; and the drive board is provided between the clamping block and the supporting block.

Further, the drive board is provided with at least two dip switches; and avoidance slots with the quantity corresponding to that of the dip switches are provided in the top of the lamp holder.

Further, dip scales are provided on an outer side of the avoidance slot.

Further, the LED lamp further includes an LED assembly and a bulb; the LED assembly is electrically connected to the drive board; and the bulb is provided on the LED assembly in a sleeving manner and is connected to the lamp holder.

Further, the LED assembly includes at least one filament.

Further, the LED assembly includes a two-color filament.

Further, a side of the drive board away from the lamp holder is provided with connecting terminals, a winding steel needle or a soldering point; and the LED assembly is connected to the connecting terminals, the winding steel needle or the soldering point.

Further, the LED lamp further includes an LED assembly and a housing; the LED assembly is electrically connected to the drive board; the housing includes at least two portions: a light transmitting portion and a lightproof portion; and the housing is connected to the lamp holder.

Further, the LED lamp further includes a switch plate; and the dip switch is provided on the switch plate.

Further, the lamp holder, the drive board and the dip switch are suitable for an A-type lamp, a G-type lamp, an R-type lamp, a PAR-type lamp, a T-type lamp and a candle-type lamp.

The present application has the following beneficial effects: since the dip switch is provided in the lamp holder, the avoidance slot is provided in the top of the lamp holder, and after the drive board and the lamp holder are assembled, the dip lever of the dip switch is movably provided in the avoidance slot or is exposed through a connecting link, the adjustment of the color temperature or brightness or other functions of a filament lamp is achieved through the exposed dip lever on the lamp holder structure, thereby achieving the adjustment of the lighting function of the lamp on a lamp body.

DETAILED DESCRIPTION OF THE EMBODIMENTS

The technical content, achieved objectives and effects of the present application are described below in detail in conjunction with implementations and accompanying drawings.

Figure 1:
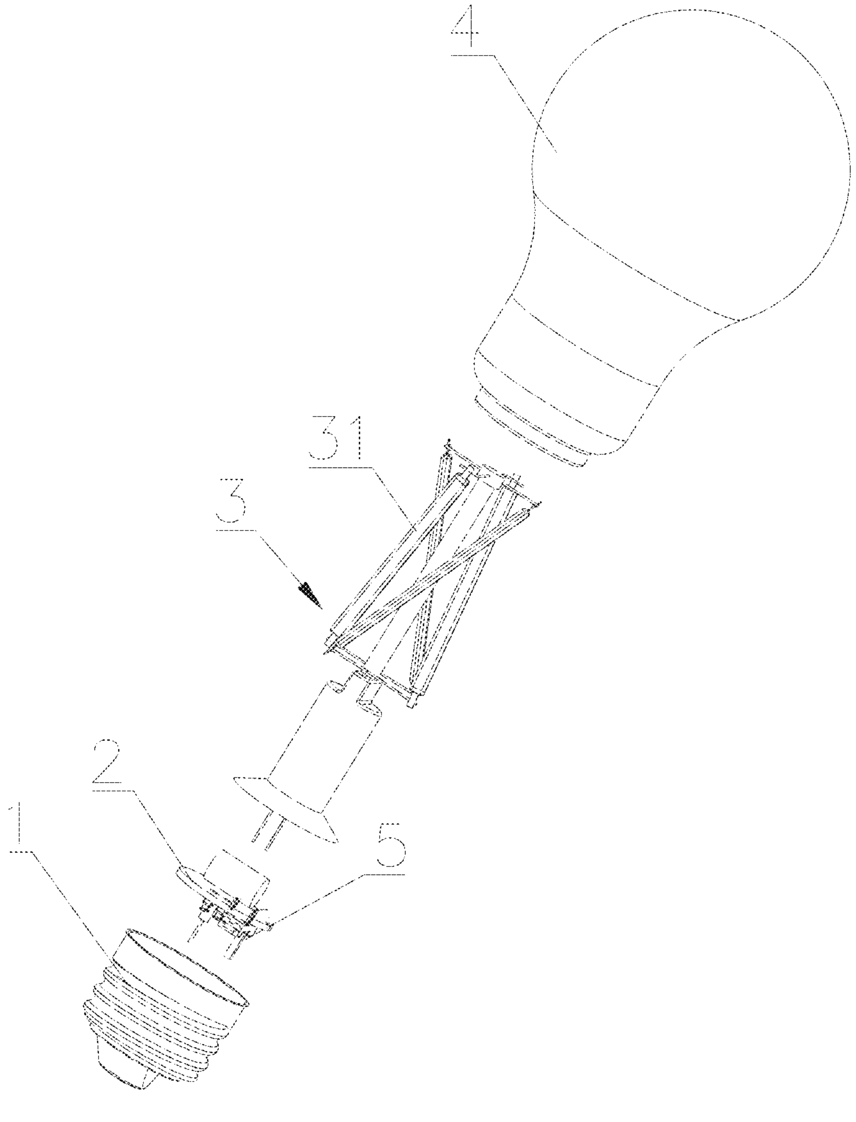
FIG. 1 is a structural exploded view of an LED lamp with a lamp holder and having an adjustable lighting function according to an embodiment.

Referring to FIG. 1, an LED lamp with a lamp holder and having an adjustable lighting function includes the lamp holder and a drive board; the lamp holder is formed with a screwing thread; a dip switch is provided in the lamp holder; an avoidance slot is provided in a top of the lamp holder; and the drive board is electrically connected to the lamp holder, and a dip lever of the dip switch is movably provided in or below the avoidance slot.

As can be seen from the above description, the present application has the following beneficial effects: since the dip switch is provided in the lamp holder, the avoidance slot is provided in the top of the lamp holder, and after the drive board and the lamp holder are assembled, the dip lever of the dip switch is movably provided in the avoidance slot or is exposed through a connecting link, the adjustment of the color temperature or brightness or other functions of a filament lamp is achieved through the exposed dip lever on the lamp holder structure, thereby achieving the adjustment of the lighting function of the lamp on a lamp body.

Further, a limiting column is provided on an inner wall of the lamp holder; a limiting notch is provided in a peripheral side of the drive board; and the limiting notch is clamped to the limiting column.

As can be seen from the above description, by providing the limiting column on the inner wall of the lamp holder and providing the limiting notch in the drive board, positioning of the drive board and the lamp holder is achieved through the limiting column and the limiting notch to ensure that the dip lever of the dip switch may be provided in the avoidance slot, and moreover, the drive board and the lamp holder may be assembled more easily.

Further, a supporting block is provided at a bottom of an inner side of the lamp holder; and the drive board is erected on the supporting block.

As can be seen from the above description, the supporting block is provided at the bottom of the inner side of the lamp holder to play a role in supporting the drive board, which improves the stability of the drive board.

Further, a clamping block is provided on an inner wall of the lamp holder; and the drive board is provided between the clamping block and the supporting block.

As can be seen from the above description, by providing the clamping block on the inner wall of the lamp holder, the clamping block and the supporting block play a role in limiting both sides of the drive board respectively, and the drive board is clamped between the clamping block and the supporting block, which greatly improves the stability of the drive board.

Further, the drive board is provided with at least two dip switches; and avoidance slots with the quantity corresponding to that of the dip switches are provided in the top of the lamp holder.

As can be seen from the above description, by providing a plurality of dip switches on the drive board, corresponding control functions are achieved based on the different dip switches, for example, color temperature adjustment and brightness adjustment may be achieved at the same time, so that the lamp has more adjustable functions to meet the different needs of users.

Further, dip scales are provided on an outer side of the avoidance slot.

As can be seen from the above description, since the dip scales are provided on the outer side of the avoidance slot, a current gear of the dip switch may be known through the dip scales.

Further, the LED lamp further includes an LED assembly and a bulb; the LED assembly is electrically connected to the drive board; and the bulb is provided on the LED assembly in a sleeving manner and is connected to the lamp holder.

As can be seen from the above description, by connecting the LED assembly to the drive board, the power supply and lighting function adjustment of the LED assembly are achieved based on the drive board.

Further, the LED assembly includes at least one filament.

As can be seen from the above description, filaments of different numbers are provided according to different application scenarios, so as to meet the lighting needs and decoration needs in different scenarios.

Further, the LED assembly includes a two-color filament.

As can be seen from the above description, the two-color filament, that is, a filament with two colors, is adopted, and dual color temperatures refer to different color temperatures of the same level, thereby better achieving color temperature regulation and control.

Further, a side of the drive board away from the lamp holder is provided with connecting terminals, a winding steel needle or a soldering point; and the LED assembly is connected to the connecting terminals, the winding steel needle or the soldering point.

As can be seen from the above description, by providing the connecting terminals, the winding steel needle or the soldering point on the drive board, the LED assembly is connected to the drive board through the connecting terminals, the winding steel needle or the soldering point, which is more conducive to the assembling of the LED assembly and the drive board.

Further, the LED lamp further includes an LED assembly and a housing; the LED assembly is electrically connected to the drive board; the housing includes at least two portions: a light transmitting portion and a lightproof portion; and the housing is connected to the lamp holder.

Further, the LED lamp further includes a switch plate; and the dip switch is provided on the switch plate.

Further, the lamp holder, the drive board and the dip switch are suitable for an A-type lamp, a G-type lamp, an R-type lamp, a PAR-type lamp, a T-type lamp and a candle-type lamp.

The filament lamp having the adjustable lighting function provided by the present application is used in scenarios with different lighting requirements, which are described by the specific implementation as follows:

Embodiment 1

Figure 2:
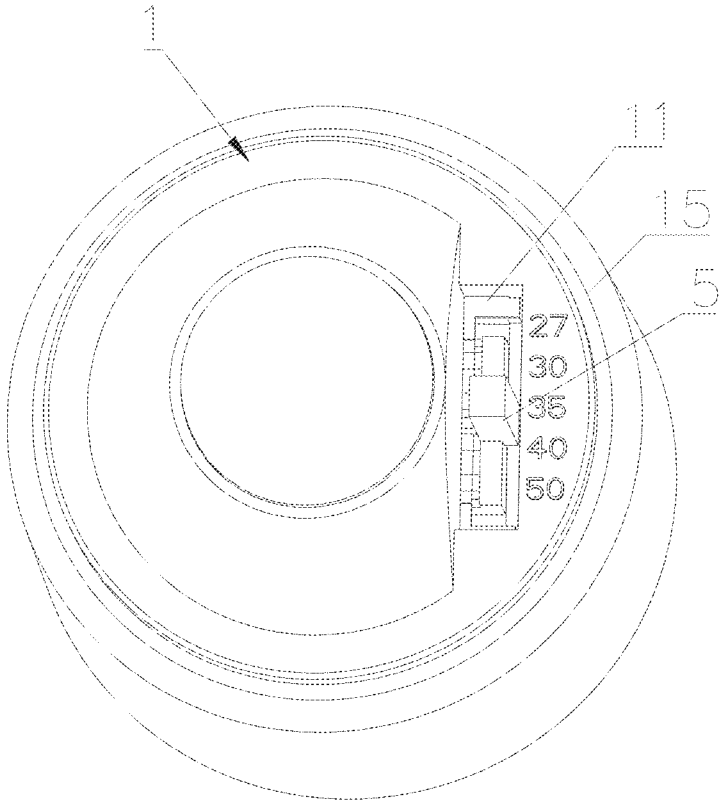
FIG. 2 is a schematic diagram of assembling of a lamp holder and a drive board of an LED lamp with a lamp holder and having an adjustable lighting function according to an embodiment.
Figure 3:
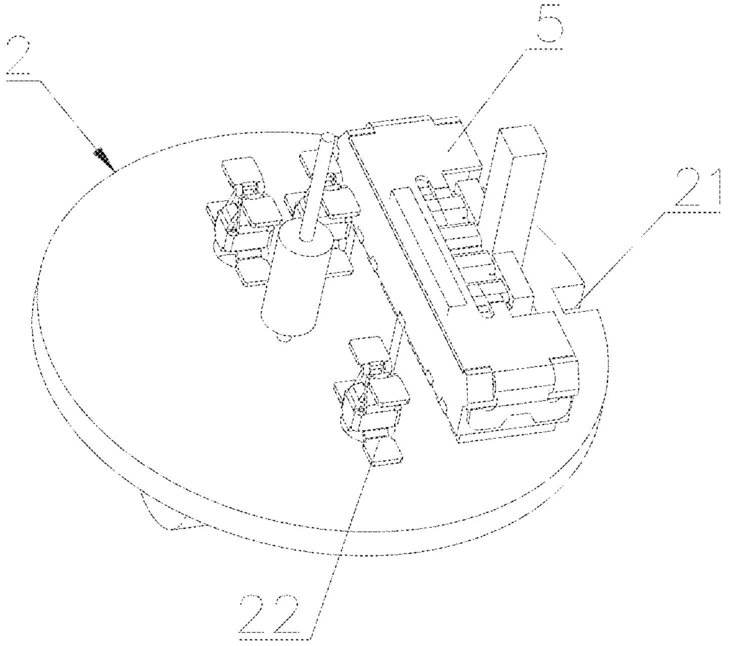
FIG. 3 is a schematic structural diagram of a drive board of an LED lamp with a lamp holder and having an adjustable lighting function according to an embodiment.

Referring to FIGS. 1 to 3, an LED lamp with a lamp holder and having an adjustable lighting function includes the lamp holder 1, a drive board 2, an LED assembly 3 and a bulb 4. The lamp holder 1 is formed with a screwing thread. The drive board 2 is provided with a dip switch 5, and, in other optional implementations, a switch plate may be separately provided and the dip switch 5 is provided on the switch plate, that is, the dip switch 5 is provided separately from the drive board 2. An avoidance slot 11 is provided in a top of the lamp holder 1. The drive board 2 is provided in the lamp holder 1, and a dip lever of the dip switch 5 is movably provided in or below the avoidance slot 11. For example, the dip lever of the dip switch 5 may be directly exposed out of the lamp holder, or a connecting member is provided and connected to the dip lever of the dip switch 5 to be exposed out of the lamp holder, that is, the dip lever may be exposed through a connecting link and other structures. The LED assembly 3 is connected to one side of the drive board 2 away from the lamp holder 1. The bulb 4 is provided on the LED assembly 3 in a sleeving manner and is connected to the lamp holder 1. Taking a filament lamp as an example, the bulb 4 is plugged into the drive board 2 through a stem hard lead wire of a filament assembly, or soldered to the soldering point through a stem soft lead wire. As shown in FIG. 3, connecting terminals 22 are provided on one side of the drive board 2 away from the lamp holder 1, and the filament assembly is plugged into the connecting terminals 22. Moreover, dip scales 15 are provided on the outer side of the avoidance slot 11.

In an optional implementation, the dip switch 5 includes color temperature switching of gear 1, gear 2, gear 3, gear 4, and gear 5, and the dip scales 15 include 27, 30, 35, 40, and 50, which indicate color temperatures of 2700 K, 3000 K, 3500 K, 4000 K, and 5000 K, respectively. The color temperature adjustment as well as gear setting may be conducted according to the actual situation to meet the needs of color temperature adjustment in different scenarios. In other optional implementations, the gears of the dip switch 5 are used for achieving the power adjustment function, for example, achieving the power switching of gear 1, gear 2, gear 3, gear 4, and gear 5, and accordingly the dip scales 15 are used for marking the brightness of different gears. When the lamp is used, a corresponding function is selected through the dip switch 5, and then the lamp is mounted on a socket.

Figure 4:
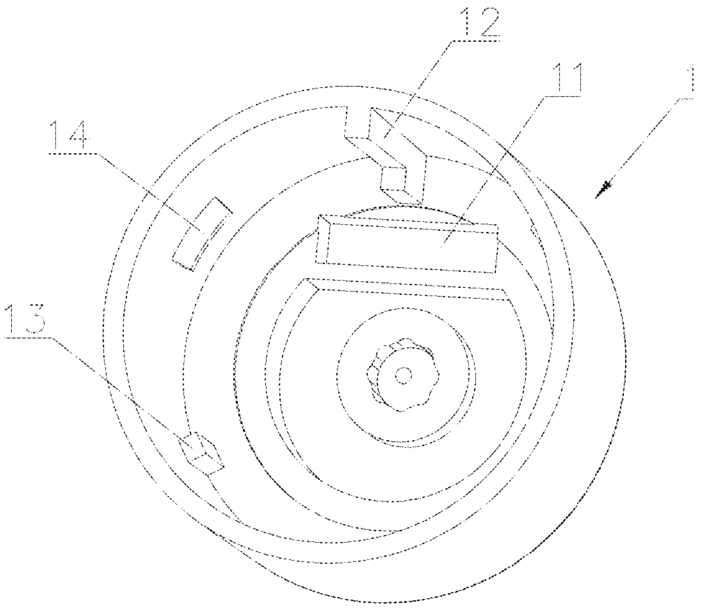
FIG. 4 is a schematic diagram of an internal structure of a lamp holder of an LED lamp with a lamp holder and having an adjustable lighting function according to an embodiment.
Figure 5:
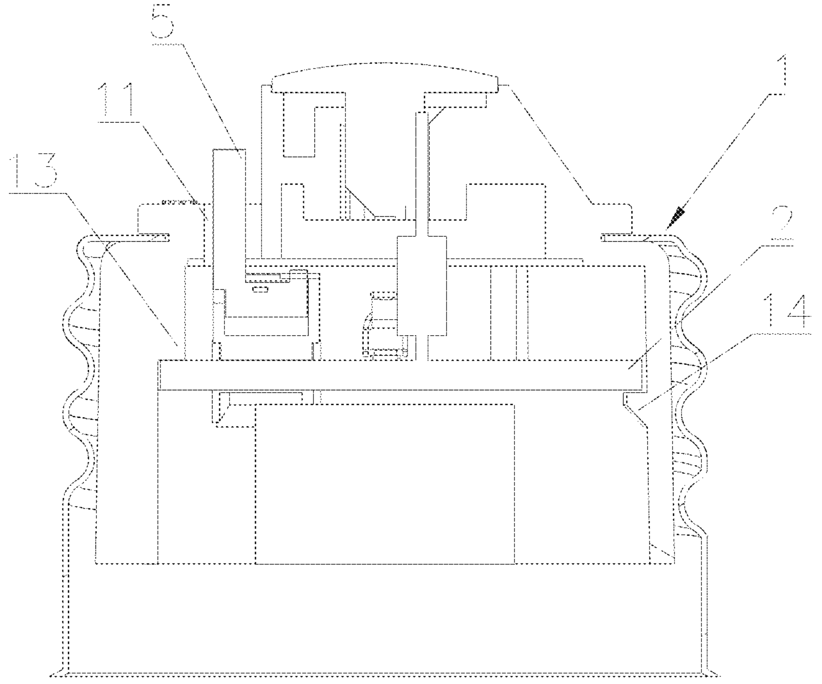
FIG. 5 is partial sectional view of a lamp holder of an LED lamp with a lamp holder and having an adjustable lighting function according to an embodiment.

Referring to FIGS. 3 to 5, a limiting column 12 is provided on the inner wall of the lamp holder 1; a limiting notch 21 is provided in the peripheral side of the drive board 2; the limiting notch 21 is clamped to the limiting column 12; moreover, a supporting block 13 is provided at the bottom of the inner side of the lamp holder 1, and a clamping block 14 is provided on the inner wall of the lamp holder 1; and the drive board 2 is erected on the supporting block 13, and the drive board 2 is provided between the clamping block 14 and the supporting block 13. As shown in FIG. 4, a plurality of clamping blocks 14 are evenly distributed on the inner wall of the lamp holder 1, and a plurality of supporting blocks 13 are evenly distributed at the bottom of the inner side of the lamp holder 1, for example, three clamping blocks 14 and three supporting blocks 13 are provided respectively, and one of the supporting blocks 13 may be integrally molded with the limiting column 12. The lamp holder 1 may be molded integrally by means of a plastic coating process or by means of a molding process in which a metal part and a plastic part are separately equipped, that is, the drive board 2 is fixed in the plastic part of a hollow cup of the lamp holder 1 through the limiting column 12, the supporting block 13 and the clamping block 14; and the dip scales 15 may be molded on the plastic part directly, or may be formed on the surface of the plastic part or on the surface of the metal part later by means of printing and lasering.

Figure 6:
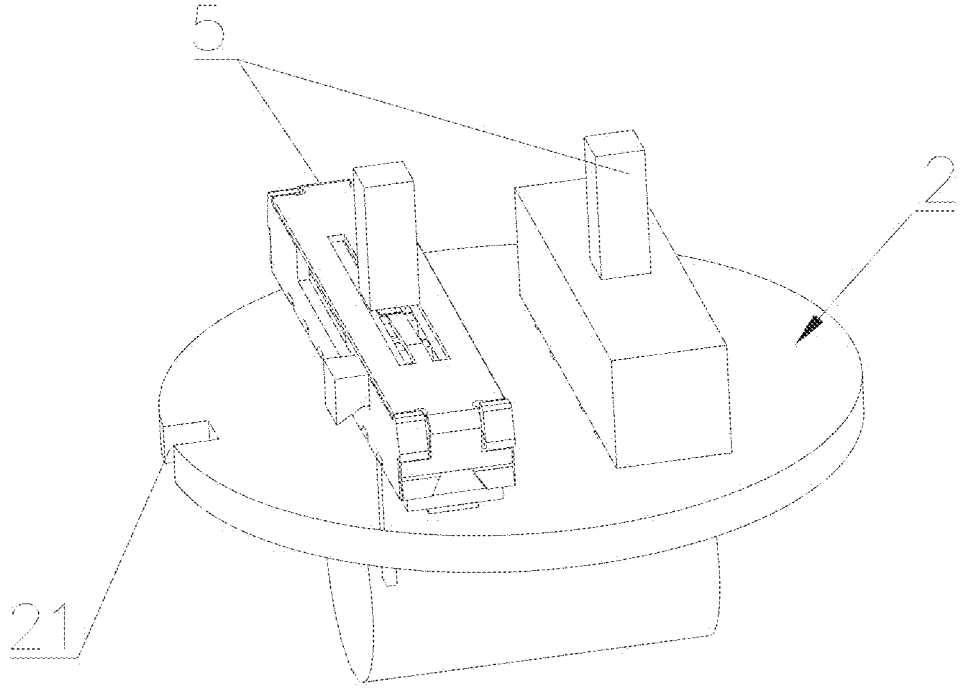
FIG. 6 is a schematic structural diagram of another drive board of an LED lamp with a lamp holder and having an adjustable lighting function according to an embodiment.
Figure 7:
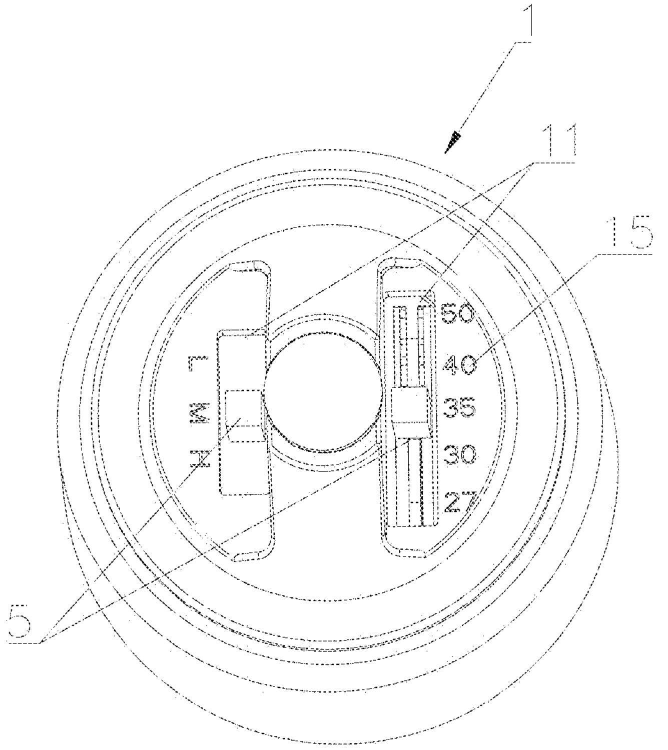
FIG. 7 is a schematic diagram of an internal structure of another lamp holder of an LED lamp with a lamp holder and having an adjustable lighting function according to an embodiment.

Referring to FIG. 6 and FIG. 7, the drive board 2 is provided with at least two dip switches 5; and avoidance slots 11 with the quantity corresponding to that of the dip switches 5 are provided in the top of the lamp holder 1. As shown in FIG. 6, in an optional implementation, the drive board 2 is provided with the two dip switches 5 provided in parallel. As shown in FIG. 7, the lamp holder 1 is also provided with the two avoidance slots 11 provided in parallel. One of the dip switches 5 is used for achieving the color temperature adjustment, and the other dip switch 5 is used for achieving the power adjustment, so that the lamp has the both functions of color temperature adjustment and power adjustment.

Figure 8:
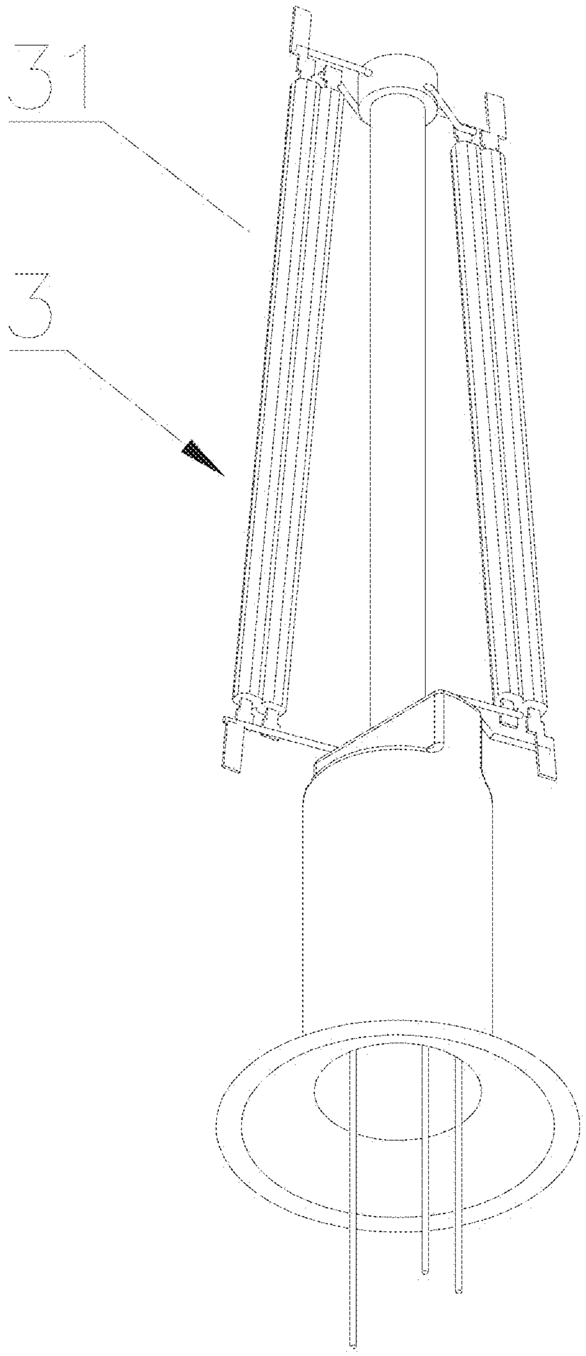
FIG. 8 is a schematic structural diagram of an LED assembly of an LED lamp with a lamp holder and having an adjustable lighting function according to an embodiment.

Referring to FIG. 1 and FIG. 8, taking a filament lamp as an example, the LED assembly 3 includes at least one filament 31, for example, in the structure of FIG. 1, the LED assembly 3 includes a total of four filaments 31; and in the structure of FIG. 8, the LED assembly 3 includes a total of two filaments 31. In an optional implementation, the LED assembly 3 includes a two-color filament 31. As shown in FIG. 8, one filament 31 has two colors inside in the form of dual color temperatures which refer to different color temperatures of the same level.

Figure 9:
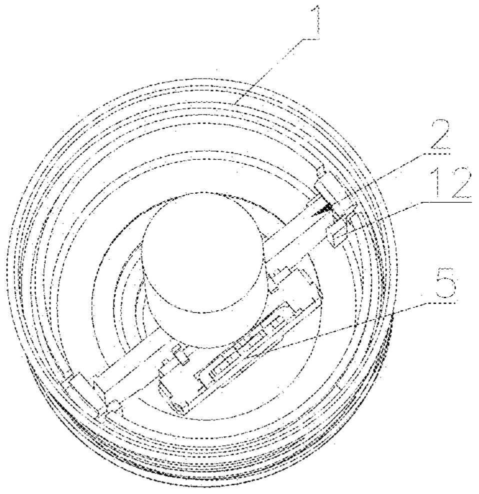
FIG. 9 is a schematic diagram of an arrangement structure of another drive board of an LED lamp with a lamp holder and having an adjustable lighting function according to an embodiment.
Figure 10:
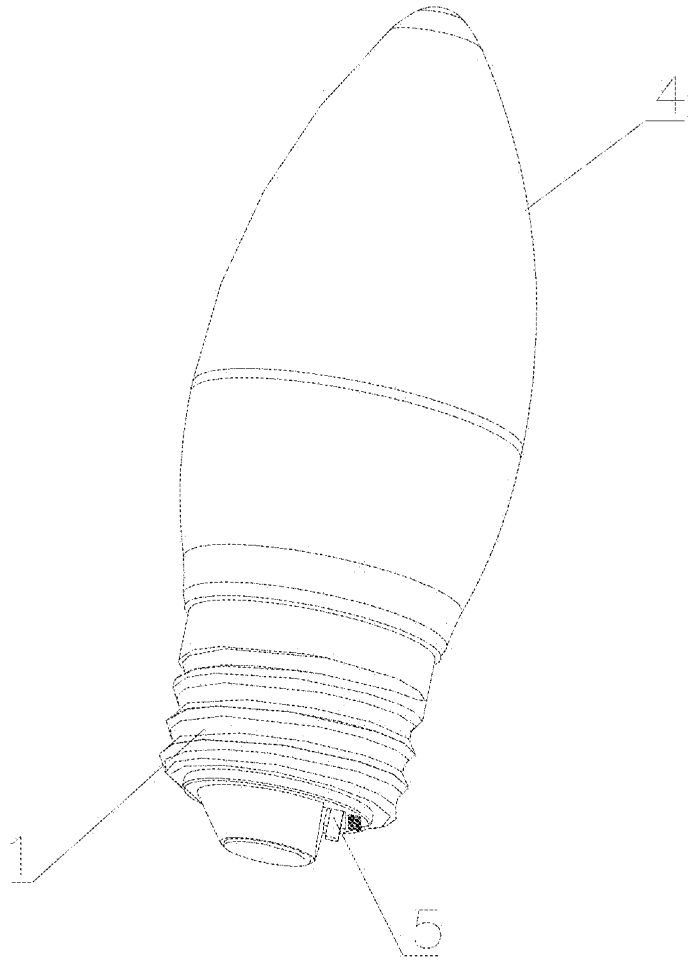
FIG. 10 is a schematic structural diagram of an LED lamp with a lamp holder and having an adjustable lighting function applied to an A-type lamp according to an embodiment.
Figure 11:
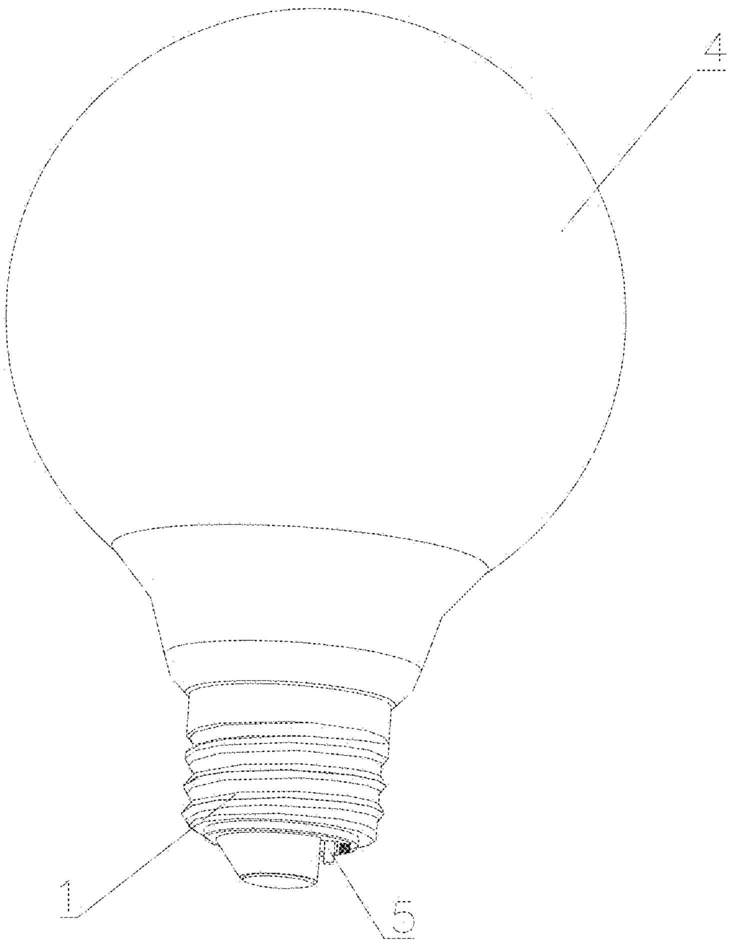
FIG. 11 is a schematic structural diagram of an LED lamp with a lamp holder and having an adjustable lighting function applied to a G-type lamp according to an embodiment.
Figure 12:
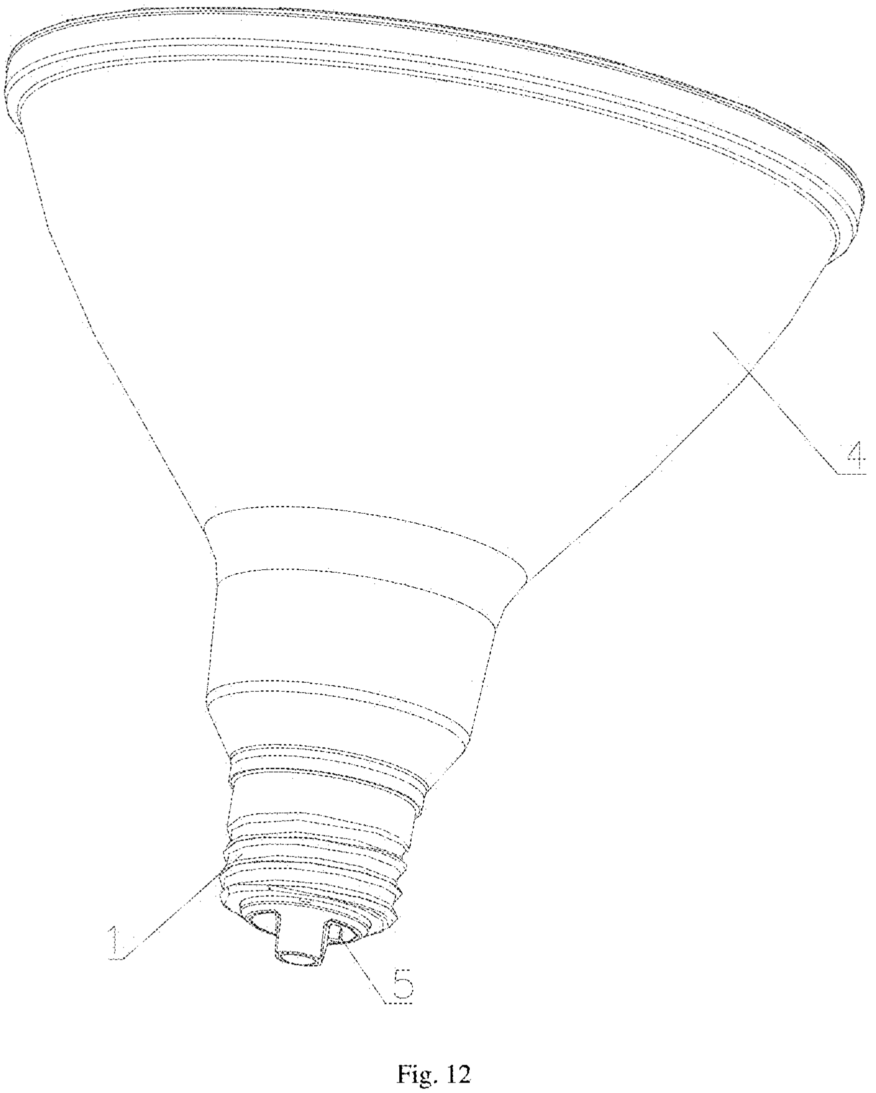
FIG. 12 is a schematic structural diagram of an LED lamp with a lamp holder and having an adjustable lighting function applied to a PAR-type lamp according to an embodiment.
Figure 13:
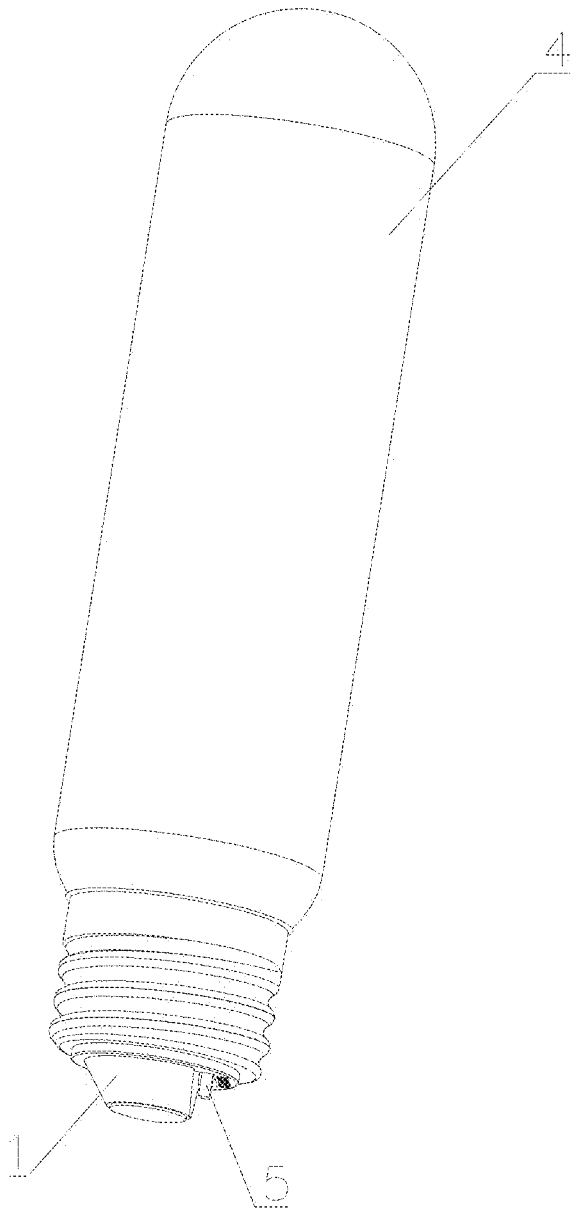
FIG. 13 is a schematic structural diagram of an LED lamp with a lamp holder and having an adjustable lighting function applied to a T-type lamp according to an embodiment.

In other embodiments, the drive board 2 is vertically placed in the lamp holder 1. Referring to FIG. 9, the drive board 2 is vertically placed in the lamp holder 1. Moreover, because the drive board 2 is placed vertically, there is no need to provide the supporting block 13 inside the lamp holder; and the structure of the limiting column 12 is improved, so that the drive board 2 placed vertically is clamped through the limiting column 12.

In other embodiments, the bulb 4 may be replaced with a housing structure; the housing includes at least two portions: a light transmitting portion and a lightproof portion; and the housing is connected to the lamp holder.

Referring to FIGS. 10-14, the LED lamp described above is applicable to different lamp types such as A-type lamps, G-type lamps, R-type lamps, PAR-type lamps, T-type lamps, and candle-type lamps. For example, when applied to a PAR-type lamp, the LED lamp includes a side lightproof portion and a top light transmitting portion.

The above are merely embodiments of the present application, and are not intended to limit the scope of the patent of the present application. Any equivalent transformation made by utilizing the contents of the specification and accompanying drawings of the present application, or directly or indirectly applying them in the related technical fields, similarly fall within the scope of protection of the patent of the present application.

What is claimed is:

1. A Light Emitting Diode (LED) lamp, comprising a lamp holder and a drive board, wherein
   the lamp holder is formed with a screwing thread;
   a dip switch is provided in the lamp holder;
   an avoidance slot is provided in a top of the lamp holder;
   the drive board is electrically connected to the lamp holder, and a dip lever of the dip switch is movably provided in or below the avoidance slot;
   a limiting column is provided on an inner wall of the lamp holder;
   a limiting notch is provided in a peripheral side of the drive board; and
   the limiting notch is clamped to the limiting column.

2. The LED lamp according to claim 1, wherein a supporting block is provided at a bottom of an inner side of the lamp holder; and the drive board is erected on the supporting block.

3. The LED lamp according to claim 2, wherein a clamping block is provided on an inner wall of the lamp holder; and the drive board is provided between the clamping block and the supporting block.

4. The LED lamp according to claim 1, wherein the drive board is provided with at least two dip switches; and avoidance slots with the quantity corresponding to that of the dip switches are provided in the top of the lamp holder.

5. The LED lamp according to claim 1, wherein dip scales are provided on an outer side of the avoidance slot.

6. The LED lamp according to claim 4, wherein dip scales are provided on an outer side of the avoidance slot.

7. The LED lamp according to claim 1, further comprising an LED assembly and a bulb, wherein the LED assembly is electrically connected to the drive board; and the bulb is provided on the LED assembly in a sleeving manner and is connected to the lamp holder.

8. The LED lamp according to claim 7, wherein the LED assembly comprises at least one filament.

9. The LED lamp according to claim 7, wherein the LED assembly comprises a two-color filament.

10. The LED lamp according to claim 8, wherein the LED assembly comprises a two-color filament.

11. The LED lamp according to claim 7, wherein a side of the drive board away from the lamp holder is provided with connecting terminals, a winding steel needle or a soldering point; and the LED assembly is connected to the connecting terminals, the winding steel needle or the soldering point.

12. The LED lamp according to claim 1, further comprising an LED assembly and a housing, wherein the LED assembly is electrically connected to the drive board; and the housing comprises at least two portions: a light transmitting portion and a lightproof portion, and the housing is connected to the lamp holder.

13. The LED lamp according to claim 1, further comprising a switch plate, wherein the dip switch is arranged on the switch plate.

14. The LED lamp according to claim 1, wherein the lamp holder, the drive board and the dip switch are suitable for an A-type lamp, a G-type lamp, an R-type lamp, a PAR-type lamp, a T-type lamp and a candle-type lamp.

* * * * *